United States Patent [19]
Tanaka

[11] Patent Number: 6,052,151
[45] Date of Patent: Apr. 18, 2000

[54] EDITING APPARATUS

[75] Inventor: Toshiyuki Tanaka, Kanagawa, Japan

[73] Assignee: Sony Corporation, Tokyo, Japan

[21] Appl. No.: 08/907,369

[22] Filed: Aug. 7, 1997

Related U.S. Application Data

[63] Continuation of application No. PCT/JP96/03593, Dec. 6, 1996.

[30] Foreign Application Priority Data

Dec. 8, 1995 [JP] Japan .................................. 7-320393

[51] Int. Cl.[7] ...................................................... G06F 13/00
[52] U.S. Cl. .......................................................... 348/467
[58] Field of Search ................................... 348/467, 510, 348/521, 721, 460, 461, 473, 500; 709/243

[56] References Cited

U.S. PATENT DOCUMENTS

| | | | |
|---|---|---|---|
| 4,430,710 | 2/1984 | Catiller et al. ............................ | 709/250 |
| 4,835,611 | 5/1989 | Nishitani ................................... | 348/571 |
| 4,942,470 | 7/1990 | Nishitani et al. ......................... | 348/721 |
| 5,014,128 | 5/1991 | Chen ......................................... | 348/448 |

FOREIGN PATENT DOCUMENTS 5-181809  7/1993  Japan .
6-139751  5/1994  Japan .

*Primary Examiner*—Moustafa M. Meky
*Attorney, Agent, or Firm*—Frommer Lawrence & Haug, LLP.; William S. Frommer

[57] ABSTRACT

A main CPU 11 of a Main CPU Module 10 simultaneously sends out control information to respective Sub CPUs 22, 32, ..., n2, ... of plural Sub CPU Modules 20, 30, ..., n0, ... by broadcast buses 201, 202 of a system bus 200. In the case where control information from the Main CPU sent out through the broadcast buses 201, 202 is control information with respect to corresponding one of Sub CPU Devices 23, 33, ..., n3, ..., each Sub CPU carries out operation control of the Sub CPU device on the basis of the corresponding control information. Thus, the Main CPU is not required to finely control processing inherent in the Sub CPU Devices or timings thereof, etc. Also in the case where new Sub CPU Device is supplemented, or Sub CPU Device of different timing is assembled or incorporated into the apparatus, modification of the control program of the Main CPU can be held down to the minimum level. In addition, control program is supplemented to Sub CPU corresponding to Sub CPU Device to be supplemented, thereby making it possible to cope with implementation of such supplement. This editing apparatus can smoothly carry out extension of the apparatus and/or enlargement of scale without lowering performance of the apparatus.

5 Claims, 4 Drawing Sheets

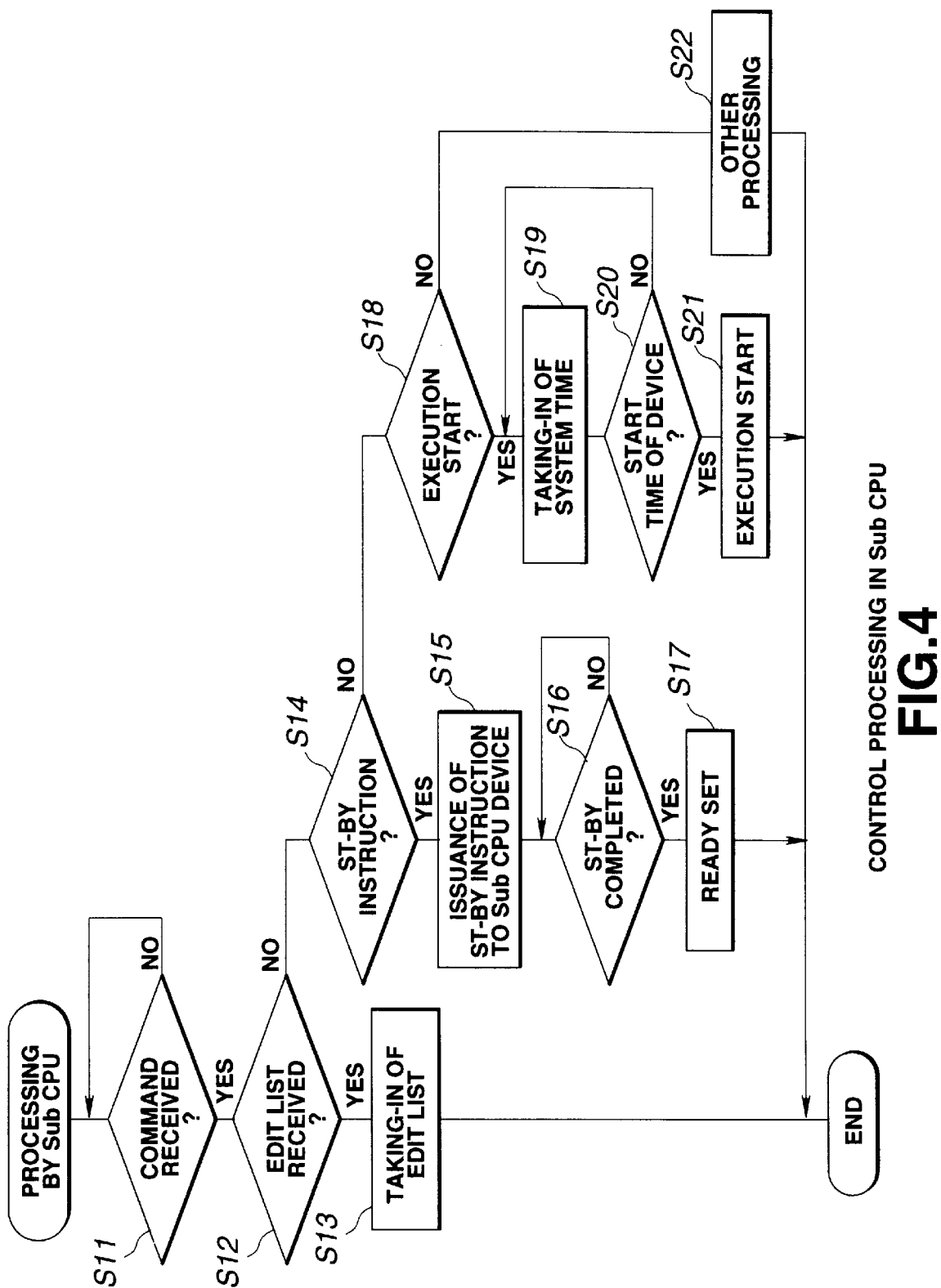
FIG.4 CONTROL PROCESSING IN Sub CPU

EDITING APPARATUS

This is a continuation of copending International Application PCT/JP96/03593 having an international filing date of Dec. 6, 1996.

TECHNICAL FIELD

1. Background of the Invention

This invention relates to an editing apparatus of the distributed processing type composed of, e.g., CPU (Central Processing Unit) for controlling the entirety of the apparatus, and plural CPUs for respectively controlling plural equipments required for editing processing such as video editing, etc.

For example, as a form when the computer system processes the job, there is a distributed processing system. This distributed processing system is featured, when compared to the centralized processing system for allowing a single computer to process all jobs in a centralized manner, as a system for carrying out processing in the state where respective jobs or small units obtained by dividing respective one jobs are distributed to computation elements connected to each other.

An editing apparatus in which a distributed processing system as described above is employed is composed of a Main CPU for controlling the entirety of the apparatus, and plural Sub CPUs for controlling various editing equipments and/or input/output equipments required for editing processing. The Main CPU and the plural Sub CPUs are connected by way of communication lines. Moreover, at the respective Sub CPUs, processes for executing processing of a portion of the editing processing are respectively placed (stored). Thus, the main CPU sends out instructions to the respective Sub CPUs. The Sub CPUs have received the instructions execute the respective processes on the basis of those instructions to thereby carry out control of the operations of the editing equipments, etc.

In a manner as described above, in conventional editing apparatuses employing the distributed processing system, plural CPUs connected by way of the communication lines carry out transmission and reception of information to each other to thereby execute the editing processing.

However, in conventional editing apparatuses as described above, the Main CPU had to independently (individually) send out instructions to individual Sub CPUs. For this reason, with increase of the number of Sub CPUs, the control program of the main CPU became complicated and the processing speed was lowered. Moreover, in the case of carrying out video editing, etc., it is required to simultaneously control several editing equipments (hereinafter each referred to as device). In this case, however, it was difficult to take synchronization therebetween for that control.

Further, since it is required to take synchronization in the case of carrying out the video editing, etc. as described above, the timing control processing is incorporated or inclusively provided in the control program of the Main CPU. However, since the timing matching (adjustment) operations are concentrated at the unit time (the same time period) in the video editing, etc., in the case where supplement of device of different timing is carried out owing to the extension (expansion) of the system, and/or change of timing of device is made, etc., it was necessary to greatly modify the control program of the Main CPU. Further, since it is difficult to predict the timing of the device to be controlled, it was necessary to gradually carry out extension/modification. Further, with respect to great modification of the control program by extension, much times are spent for the modifying work and/or the debacking work. Furthermore, it was difficult to supplement device of different timing, or to change the timing of device in the state where the conventional timings are maintained.

In addition, in the case where attempt is made to develop the editing apparatus for carrying out high level editing processing, since the control program for the editing processing is concentrically incorporated in the Main CPU, much times were spent for the development work, and/or the modifying work and the debacking work for the control program.

From facts as described above, in the conventional editing apparatus, it was impossible to smoothly carry out extension of the apparatus or enlargement of scale, etc. In addition, in the case where extension of the apparatus or enlargement of scale, etc. is carried out, the performance of the apparatus was lowered in dependency upon such change.

2. Object of the Invention

This invention has been made in view of actual circumstances of the prior art as described above, and has objects as described below.

Namely, an object of this invention is to provide an editing apparatus capable of smoothly carrying out the editing processing, and precisely and easily taking synchronization within the apparatus.

In addition, another object of this invention is to provide an editing apparatus capable of easily carrying out extension of the apparatus and enlargement of scale without lowering the performance of the apparatus.

SUMMARY OF THE INVENTION

In an editing apparatus according to this invention, main control means simultaneously sends out control information to plural sub control means by way of bradcast bus (in a form essentially having an ability to transfer multiple address information therethrough) of connecting means. In the case where control information from the main control means sent out through the broadcast bus is control information with respect to corresponding editing means, each of the plural sub control means carries out operation control of the editing means on the basis of the corresponding control information. Thus, it is not required for the main control means to finely control processing inherent in the editing means or timings thereof, etc. For this reason, also in the case of supplementing new editing means to the apparatus, or assembling or inclusively providing editing means of different timing thereinto, the necessity of modifying the control program of the main control means can be held down to the minimum level. In addition, an approach is employed to supplement control program to sub control means corresponding to editing means to be supplemented, thereby making it possible to easily cope with implementation of such supplement. Accordingly, this editing apparatus can smoothly carry out extension of the apparatus and/or enlargement of scale without lowering the performance of the apparatus.

Moreover, in an editing apparatus according to this invention, e.g., main control means simultaneously sends out control information to plural sub control means by broadcast bus (in a form essentially having an ability to transfer multiple address information theretrough) constituting connecting means for carrying out connection in bus form of the plural sub control means and the main control means. The plural sub control means are operative so that in the case where control information from the main control means sent out through the broadcast bus is control information with respect to corresponding editing means, each of the plural sub control means carries out operation control of the editing means on the basis of the corresponding control information.

Further, in the editing apparatus according to this invention, e.g., the main control means simultaneously sends out control information to the plural sub control means by way of the broadcast bus, or selectively sends out control information to a specific sub control means of the plural sub control means.

Further, the control information in the editing apparatus according to this invention is, e.g., synchronization (Sync) instruction information. Namely, the main control means simultaneously sends out Sync instruction information to the plural sub control means by the broadcast bus of the connecting means. Thus, the same instruction is sent to individual editing means (units). Accordingly, the editing processing of the horizontal distributed type can be smoothly carried out, and synchronization within the apparatus can be easily and precisely taken.

Further, the control information in the editing apparatus according to this invention is, e.g., control program information. Namely, the main control means simultaneously sends out control program information to the plural sub control means by the broadcast bus of the connecting means. Thus, the same control program information is sent out to individual editing means (units). Accordingly, it is possible to prevent that the processing of the control program for the editing processing is concentrated at the main control means. For this reason, also in the case of carrying out development of an editing apparatus adapted for carrying out high level editing processing, etc., work for modification or deback, etc. can be lessened. Thus, extension of the apparatus (system) or enlargement of scale can be smoothly carried out.

BRIEF DESCRIPTION OF THE DRAWINGS

FIG. 4 is a flowchart showing control processing of the Sub CPU.

DETAILED DESCRIPTION

The best mode (form) for carrying out this invention will be described below in detail with reference to the attached drawings.

Figure 1:
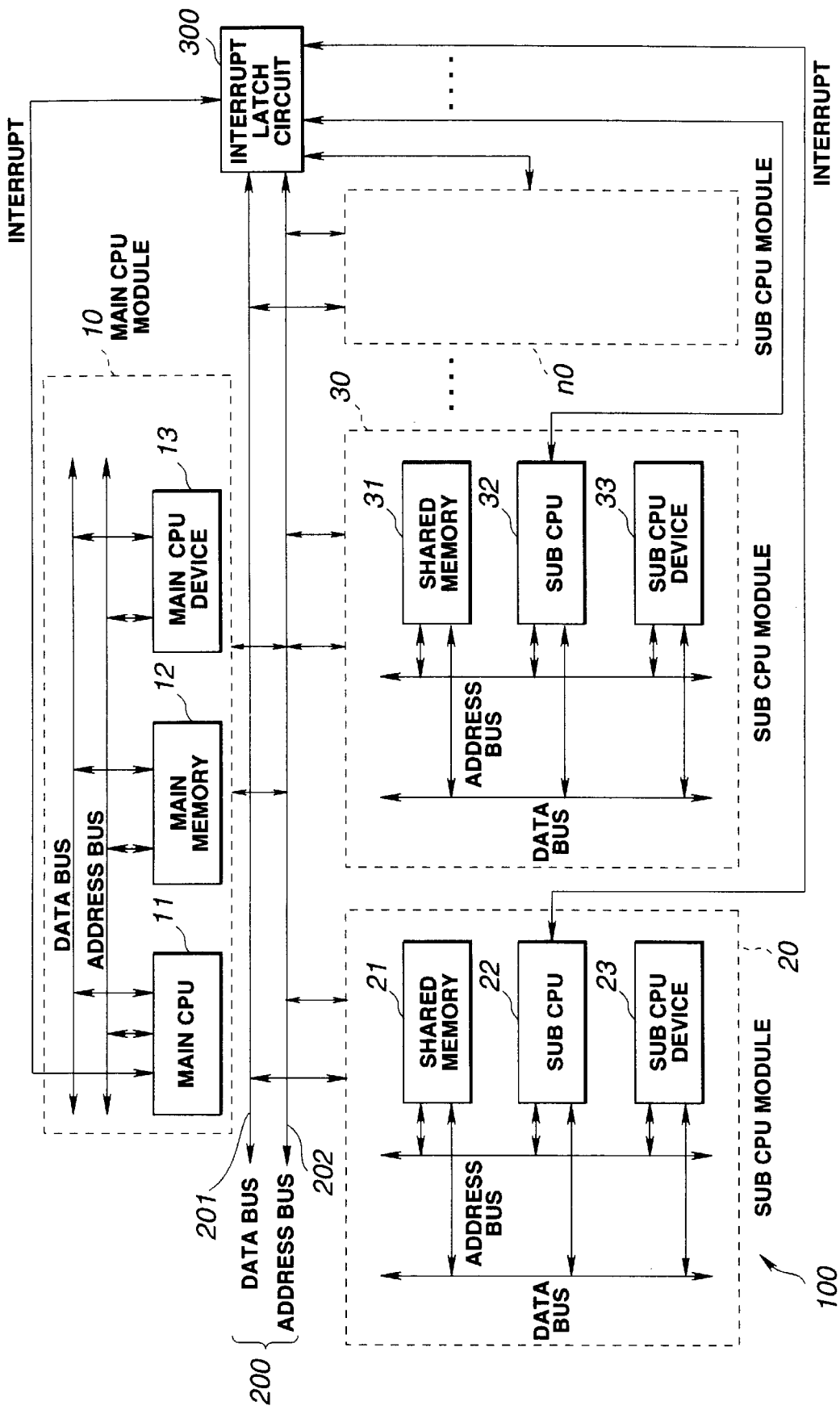
FIG. 1 is a block diagram showing the configuration of an editing apparatus according to this invention.

An editing apparatus according to this invention is constituted as indicated by the block diagram of FIG. 1, for example. This editing apparatus 100 comprises a Main CPU module 10, plural Sub CPU Modules 20, 30, . . . , n0, . . . , and an interrupt (interruption) latch circuit 300. The Main CPU Module 10, the Sub CPU Modules 20, 30, . . . , n0, . . . , and the interrupt latch circuit 300 are caused to undergo connection in bus form by way of a system bus 200.

The Main CPU Module 10 is composed of a Main CPU 11, a Main Memory 12, and a Main CPU Device 13. The Main CPU Module 10 is connected to man-machine interface device such as display unit, etc., host computer (high order) system and other systems, etc. although not shown, and serves to carry out communication and/or interface control with those devices or systems, and to carry out operation control of the entirety of the apparatus. In addition, e.g., CPU (having basic clock frequency) of 25 MHz is used as the Main CPU 11.

The Sub CPU Modules 20, 30, . . . , n0, . . . are respectively composed of shared memories 21, 31, . . . , n1, . . . , Sub CPUs 22, 32, . . . , n2, . . . , and Sub CPU Devices 23, 33, . . . , n3, . . . . The respective Sub CPUs 22, 32, . . . , n2, . . . control the respective Sub CPU Devices 23, 33, . . . , n3, . . . in accordance with information from the Main CPU 11. In addition, as the respective Sub CPUs 22, 32, . . . , n2, . . . , e.g., CPUs of 25 MHz similar to Main CPU 11 as described above are respectively used.

The Sub CPU devices 23, 33, . . . , n3, . . . are devices corresponding to various editing equipments and/or input/output equipments required for the editing processing, e.g., switcher, effector for producing image effect, video tape recorder for outputting video source, camera, and computer for outputting characters and graphics, etc. In addition, the Sub CPU Devices 23, 33, . . . , n3, . . . . are controlled from the sub CPUs 22, 32, . . . , n2, . . . so that they respectively become operative.

The system bus 200 includes a data bus 201 and an address bus 202, and uses, as the data bus 201 and the address bus 202, broadcast bus (in a form essentially having an ability to transfer multiple address information therethrough). Moreover, the system bus 200 connects the Main CPU Module 10 and the Sub CPU Modules 20, 30, . . . , n0, . . . by the serial link system, for example. Accordingly, various information can be transmitted (transferred) through such system bus 200 from the Main CPU Module 10 to the Sub CPU Modules 20, 30, . . . , n0, . . . , or from the Sub CPU Modules 20, 30, . . . , n0, . . . to the Main CPU Module 10.

Since CPUs of 25 MHz are respectively used as the Main CPU 11 and the Sub CPUs 22, 32, . . . , n2, . . . as described above, transfer speeds (rates) of data in the respective CPUs correspondingly become equal to a transfer speed (rate) in which (time) width if 1 clock is 40 n sec. Accordingly, in the case where data transfer is carried out at 2 wait 1 cycle, i.e., one cycle including two wait time periods, it becomes possible to carry out data transfer at transfer speed (rate) of ($1/120$n sec)×Bus width 4 bytes, i.e., about 33 M byte/sec. In addition, since the Main CPU 11 and the Sub CPUs 22, 32, . . . , n2, . . . are connected (interconnected) by the system bus 200 using the serial link system, the maximum transfer speed (rate) becomes equal to 1.3 M byte/sec at 20 M bps.

The connection state between the Main CPU 11 and the Sub CPUs 22, 32, . . . , n2, . . . will now be described in more practical sense.

Figure 2:
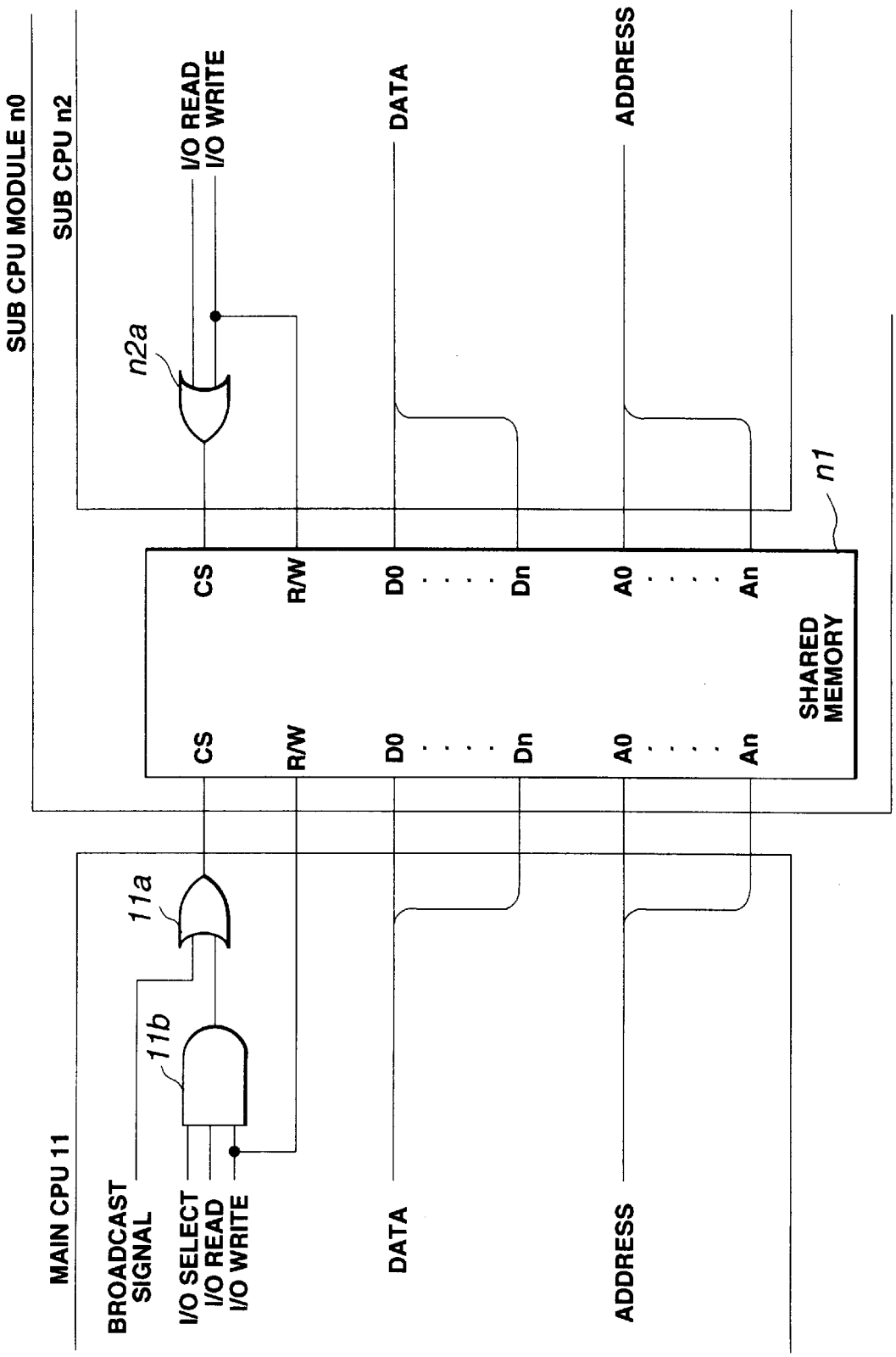
FIG. 2 is a view for explaining connection state between Main CPU and Sub CPU of the editing apparatus.

The Main CPU 11 is adapted to output or input Broadcast signal indicating whether a signal sent out from the Main CPU 11 is multiple (address) information signal sent to all the Sub CPUs or an individual (address) information signal sent to the specific Sub CPU, I/O select signal for designating Sub CPU in the case where information is transmitted to the specific Sub CPU, I/O Read signal and an I/O Write signal respectively indicating the information read operation mode and the information write operation mode, Data signal for carrying out transmission/reception of data, and Address signal for carrying out transmissions/reception of address information. In addition, as shown in FIG. 2, the I/O select signal, the I/O Read signal and the I/O Write signal are inputted to an AND circuit 11*b*, and an output from the AND circuit 11*b* and the Broadcast signal are inputted to an OR circuit 11*a*.

Moreover, the Sub CPU Modules 20, 30, . . . , n0, . . . are respectively of similar structures. As shown in FIG. 2, for example, the Sub CPU Module n0 includes shared memory n1 and Sub CPU n2. The Sub CPU n2 serves to input/output I/O Read signal and I/O Write signal respectively indicating the information read operation mode and the information write operation mode, data signal for carrying out transmission/reception of data, and Address signal for carrying out transmission/reception of address information. In addition, the I/O Read signal and the I/O Write signal are inputted to an OR circuit n2a.

Further, terminals CS, R/W, D0 . . . Dn, A0 . . . An of respective shared memories 21, 31, . . . , n1, . . . of all the Sub CPU Modules 20, 30, . . . , n0, . . . are supplied with respective signals from the Main CPU 11, i.e., output signal of the OR circuit 11a, I/O Write signal, Data signal, and the Address signal through the system bus 200. Moreover, the other one terminals CS, R/W, D0 . . . Dn, A0 . . . An of the respective shared memories 21, 31, . . . , n1, . . . are supplied with respective signals from the Sub CPU n2, i.e., output signal of the OR circuit n2a, I/O Write signal, Data signal and Address signal through the system bus 200.

It is to be noted that the respective sub CPUs 22, 32, are similar to the Sub CPU n2, their detailed explanation will be omitted.

As described above, shared memories that the respective Sub CPUs and the Main CPU 11 can use in a shared manner are provided at the respective Sub CPU Modules 20, 30, . . . , n0, . . . . Further, transmission (transfer) of information from the Main CPU 11 to the Sub CPU n2 is carried out through the shared memory via the data bus 201 and the address bus 202 using broadcast bus as described above.

At this time, the Broadcast signal sent out from the Main CPU 11 is a signal indicating that an Address signal sent to respective Sub CPUs is a signal to send (designate) multiple address (plural addresses) for simultaneously sending the same information to all the Sub CPUs 22, 32, . . . ,n2, . . . , i.e., the multiple address signal, n2, . . . , or a signal to select an arbitrary Sub CPU to send address only to that Sub CPU (designate address of that Sub CPU), i.e., the individual address signal.

To speak more practically, in the case where the Main CPU 11 sends out information such as instruction, etc. for which synchronization is required to all the Sub CPU Modules 20, 30, . . . , n0, . . . , it allows the Address signal to be sent out to be the multiple address signal. Thus, information such as the same instruction, etc. is sent to all the Sub CPUs 22, 32, . . . , n2, . . . including the Sub CPU n2. Further, each of all the Sub CPUs 22, 32, . . . , n2, . . . which have received information such as instruction, etc. from the Main CPU 11 judges whether or not the concerned information is information sent out to the own device to carry out operation control of the Sub CPU Device within the same Module in accordance with that judgment result.

Moreover, in the case where the Main CPU 11 sends control information for controlling Sub CPU Device n3 only to, e.g., specific Sub CPU n2, or makes a setting of the Sub CPU n2, etc., it allows the Address signal sent to the Sub CPU n2 to be the individual address signal. Thus, the Sub CPU n2 is selected, and ordinary addressing is carried out with respect to the Sub CPU n2. In response thereto, the Main CPU 11 carries out read/write operation of data with respect to the Sub CPU n2.

On the other hand, in the case where transmission (transfer) of information is carried out from the respective Sub CPU Modules 20, 30, . . . , n0, . . . to the Main CPU 11, the individual Sub CPUs can provide access to the Main CPU by using the Interrupt signal and the individual address of the Main CPU 11.

For example, in the case of carrying out transmission (transfer) of information from the Sub CPU n2 to the Main CPU 11, the Sub CPU n2 writes information into the above-described shared memory n1, and provides interruption by using the Interrupt signal with respect to the Main CPU 11. Thus, the Main CPU 11 recognizes by the Interrupt signal from the interrupt latch circuit 300 that interruption from the Sub CPU n2 has been provided. In a manner similar to that at the time of access with respect to the above-described Sub CPU n2, the Main CPU 11 allows the I/O Select signal to be a signal to select the Sub CPU n2 to read out, by using I/O Read signal and I/O Write signal, information from the shared memory n1 within the Sub CPU Module n0.

As described above, in accordance with the editing apparatus 100, since the broadcast bus is used as the data bus 201 and the address bus 202, the Main CPU 11 can transmit (transfer) information to all the Sub CPUs by one write operation irrespective the number of existing Sub CPUs even if a large number of Sub CPUs exist. For this reason, the Main CPU 11 can simultaneously provide interruption with respect to all the Sub CPUs by using the Interrupt signal.

The control processing in the main CPU 11 and the Sub CPUs 22, 32, . . . , n2, . . . will now be described in more practical sense.

Although the control program incorporated into the Main CPU 11 changes in dependency upon the use purpose or application, the editing apparatus 100 is assumed in this example to be used in the video system. For this reason, it is necessary for the Main CPU 11 to control the entirety of the apparatus in synchronism with the horizontal synchronization (Sync) signal.

In this example, the control program incorporated or included in the Main CPU 11 consists of control program for editing processing (hereinafter referred to as editing program) and control program for sending processing (hereinafter referred to as sending program), wherein both control programs are adapted to control various controlled systems in accordance with the horizontal synchronization (Sync) signal.

The Main CPU 11 carries out, on the basis of respective control programs as described above, processing such as preparation of control list, sending-out to the Sub CPUs 22, 32, . . . , n2, . . . of the prepared list, setting of time, and start of execution, etc.

In this instance, e.g., the editing program and the sending program are common in connection with control by the above-described horizontal Sync signal, but are different in connection with the following point. Namely, in the case of the editing program, since wait time such as detection of the leading (head) portion takes place, processing must be carried out for a second time even in the case where error takes place. On the contrary, in the case of the sending program, there is n0 wait time. In addition, the sending program is hardly required to carry out processing for a second time, and is caused to be processed along the time axis.

In the editing apparatus 100 of this embodiment, the CPU 11 carries out control of the Sub CPUs by the horizontal synchronization signal which is common point with respect to the editing program and the sending program by using the data bus 201 and the address bus, i.e., the broadcast bus. Moreover, transmission (transfer) of information from individual Sub CPU Devices 23, 33, . . . , n3, . . . to the Main CPU 11 is carried out by transmission (transfer) of information by individual addresses from individual Sub CPUs to the Main CPU 11 as described above.

Figure 3:
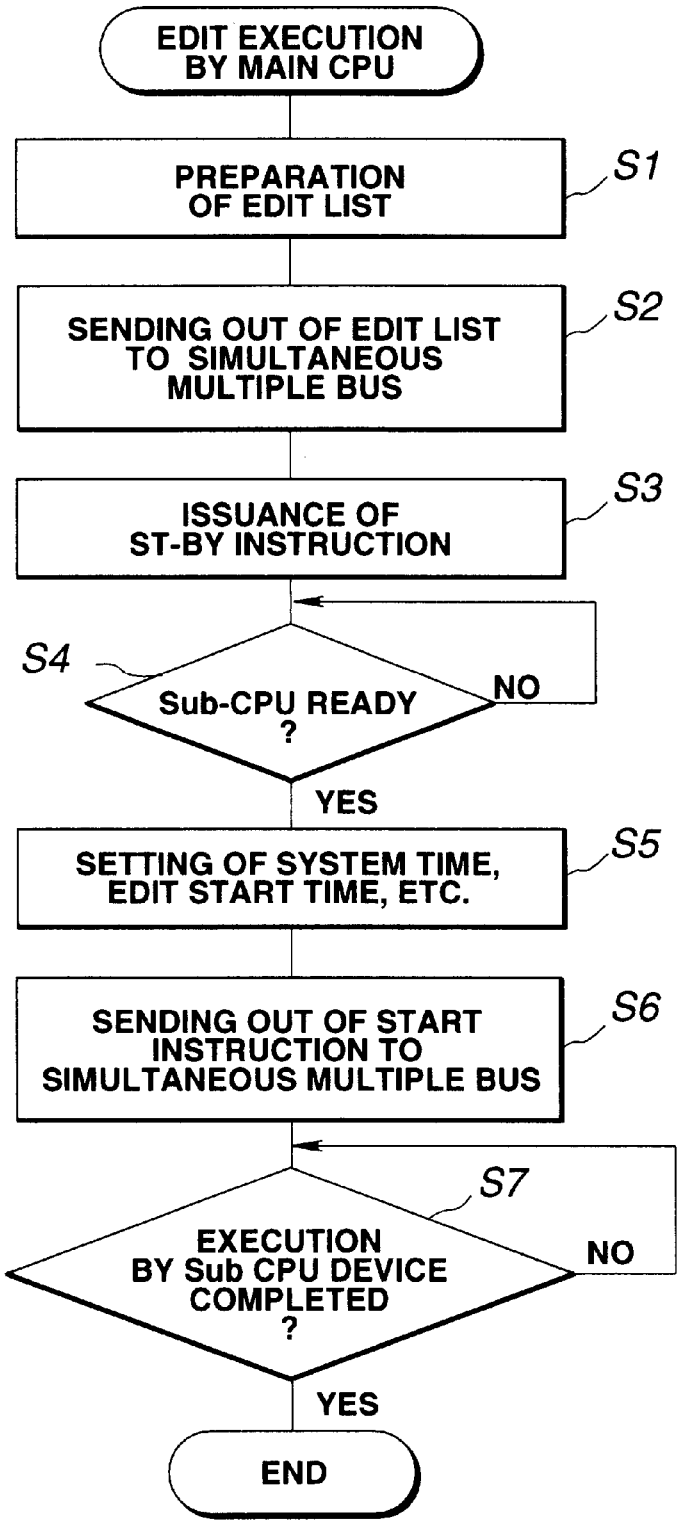
FIG. 3 is a flowchart showing control processing of the Main CPU.

FIGS. 3 and 4 are flowcharts showing the control processing of the Main CPU 11 and the Sub CPUs 22, 32, ..., n2, .... Respective control processing will be described below by using the above-mentioned FIGS. 3 and 4.

Initially, when, e.g., designation (instruction) of editing execution is given with respect to the main CPU 11 by keyboard (not shown) as shown in the FIG. 3 mentioned above, the Main CPU 11 prepares list of control sequence in the editing processing (hereinafter referred to as editing list (labeled Edit List in the figure)) (step S1). Then, the Main CPU 11 sends out the editing list thus prepared to all the Sub CPUs 22, 32, ..., n2, ... by way of the broadcast bus (step S2). Simultaneously therewith, the Main CPU 11 sends out designation (instruction) of preparation with respect to respective Sub CPU Devices 23, 33, ..., n3, ... (hereinafter referred to as ST-BY instruction) to the Sub CPUs 22, 32, ..., n2, ... by way of the broadcast bus (step S3).

Then, the Main CPU 11 judges whether or not the Sub CPUs 22, 32, ..., n2, ... receive the ST-BY instruction and the Sub CPU Devices 23, 33, ..., n3, ... are thus brought into ready (standby) state by the control based on the ST-BY instruction of the Sub CPUs 22, 32, ..., n2, ... (step S4). Then, the Main CPU 11 repeats this step processing until the Sub CPU Devices 23, 33, ..., n3, ... have been brought into ready (standby) state.

When the Sub CPU Devices 23, 33, ..., n3, ... have been brought into the ready (standby) state, the Main CPU 11 individually set the system times, the start times of the editing processing, and the editing processing times, etc. with respect to the Sub CPUs 22, 32, ..., n2, ... (step S5).

Then, the Main CPU 11 sends out designation (instruction) of start of execution (hereinafter referred to as start instruction) by way of the broadcast bus.

Then, the main CPU 11 judges whether or not the Sub CPUs 22, 32, ..., n2, ... receive the start instruction and respective Sub CPU Devices 23, 33, ..., n3, ... have completed the respective editing processing by the control based on the start instruction of the Sub CPUs 22, 32, ..., n2, ... (step S7). Then, the Main CPU 11 repeats this step processing until the Sub CPU Devices 23, 33, ..., n3, ... have completed the respective editing processing. Thereafter, when the Sub CPU Devices 23, 33, ..., n3, ... have completed respective editing processing, the Main CPU 11 completes this processing.

Then, the Sub CPUs 22, 32, ..., n2, ... operate as follows. For example, the Sub CPU n2 judges, as shown in the FIG. 4 mentioned above, whether or not it receives command from the Main CPU 11 (step 11) to repeat this step processing until it receives command from the Main CPU 11.

When the Sub CPU n2 receives the command from the Main CPU 11, it judges whether or not that command is command indicating the editing list (step S12).

In the case where it is judged that the command that the Sub CPU n2 has received command is the command indicating the editing list, the Sub CPU n2 takes thereinto the editing list from the Main CPU 11 through the broadcast bus (step S13). Although not shown, the Sub CPU n2 prepares protocol (control procedure), etc. required for control of the Sub CPU Device n3 on the basis of the editing list thus taken in to complete this processing. Accordingly, processing indicated below will be carried out on the basis of the protocol mentioned above.

On the other hand, in the case where it is judged at the step S12 that command that the Sub CPU n2 has received is not the command indicating the editing list, the Sub CPU n2 judges whether or not the received command is the command indicating the ST-BY instruction (step S14).

In the case where it is judged that the command that the Sub CPU n2 has received is the command indicating the ST-BY instruction, the Sub CPU n2 sends out the ST-BY instruction to the Sub CPU Device n3 (step S15). Thus, the Sub CPU Device n3 carries out the preparatory operation, e.g., detection of the head (leading) portion, open of file and seek of file, etc.

Then, the Sub CPU n2 judges whether or not the Sub CPU Device n3 receives the ST-BY instruction and preparatory operation as described above has been thus completed (hereinafter referred to as ST-BY completed state) (step S16) to repeat this step processing until the Sub CPU Device n3 is brought into the ST-BY completed state.

When the Sub CPU Device n3 has been brought into the ST-BY completed state, the Sub CPU n2 recognizes that the Sub CPU Device n3 has been actually placed in the ST-BY completed state to set ready (standby) state of the Sub CPU Device n3 (step S17) thus to complete this processing.

On the other hand, in the case where it is judged at the step S14 that the received command is not the command indicating the ST-BY instruction, the Sub CPU n2 judges whether or not the received command is the start instruction (step S18).

In the case where the Sub CPU n2 has judged that the received command is the start instruction, it takes thereinto the system time from the Main CPU 11 (step S19).

Then, the Sub CPU n2 judges whether or not the system time thus taken in is the start time of the editing processing set by the Main CPU 11 in the processing of the step S5 shown in the FIG. 3 mentioned above, i.e., the operation start time of the Sub CPU Device n3 (step S20) to repeat respective processing of the step S19 and the step S20 until the system time becomes equal to the operation start time of the Sub CPU Device n3. In addition, at this time, the Sub CPU n2 carries out adjustment of delay, etc. of the Sub CPU Device n3 in accordance with the set operation start time.

When the system time becomes equal to the operation start time of the Sub CPU Device n3, the Sub CPU n2 carries out adjustment of the operation execution timing of the Sub CPU Device n3 to control the Sub CPU Device n3 so as to start the operation (step S21). Thereafter, the Sub CPU n2 completes this processing.

On the other hand, in the case where the Sub CPU n2 judges that the received command is not the start instruction, i.e., in the case where it judges that the received command is command except for the editing list, the ST-BY instruction and the start instruction described above, it carries out processing based on instruction that the received command indicates (step S22) to complete this processing.

As described above, the Main CPU 11 is not required to finely control processing inherent in the devices and/or timings thereof, etc. For this reason, also in the case where new device is supplemented and/or device of different timing is assembled or incorporated into the apparatus, the necessity to modify the control program of the Main CPU 11 can be held down to the minimum level. Moreover, in this case, control program is supplemented to the Sub CPU of device to be supplemented, thereby making it possible to easily cope with implementation of such supplement. Accordingly, this editing apparatus 100 can smoothly carry out extension of the apparatus and/or enlargement of scale, etc. without lowering the performance of the apparatus.

Further, because of employment of the broadcast bus in a form essentially having an ability to transfer multiple address information therethrough, with respect to instructions which requires synchronization, i.e., synchronization instructions, e.g., recording start, reproduction start and temporary stop, etc., the same instruction will be sent out to individual devices. Accordingly, the editing processing of the horizontal distributed type can be smoothly carried out, and synchronization within the apparatus can be easily taken. Further, for example, in the case where the Main CPU 11 transmits (transfers) common time to all the Sub CPUs 22, 32, . . . , n2, . . . , this broadcast bus system having a function to transfer multiple address information therethrough is particularly effective because time delay does not take place.

While the Main CPU 11 and the Sub CPUs 22, 32, . . . , n2, . . . are connected (interconnected) by the serial link system in the above-described editing apparatus 100, they may be connected (interconnected) by the Ethernet system (Zerox Company) using the coaxial cable. In this case, if the transmission rate is 10 Mbps, the maximum transfer rate (speed) becomes equal to 800 K byte/sec.

It is to be noted in the case where respective CPUs are connected by the serial bus system like the Ethernet system, collision, etc. of transmit data when the Sub CPUs 22, 32, . . . , n2, . . . attempt to simultaneously transmit data to the Main CPU 11 may take place. For this reason, in this case, an implementation should be carried out such that the bus system employed can be used as a broadcast bus for transferring multiple address information as described above through the serial bus, and that the Main CPU 11 can individually cope with transmission from the Sub CPUs 22, 32, . . . , n2, . . . . Thus, collision of transmit data by the serial bus can be avoided, and high speed CPUs can be respectively used as the CPU 11 and the Sub CPUs 22, 32, . . . , n2, . . . . In addition, limitation of the number of connections of the Sub CPU Modules 20, 30, . . . , n0, . . . can be relieved to much degree.

What is claimed is:

1. An editing apparatus comprising:

main control means for controlling the entirety of the apparatus;

plural editing means;

plural sub control means provided in correspondence with the respective plural editing means and adapted for carrying out operation controls of the respective editing means on the basis of control of the main control means; and connecting means for connecting the plural sub control means and the main control means, wherein the connecting means uses broadcast bus (in a form essentially having an ability to transfer multiple address information therethrough), the main control means simultaneously sends out control information to the plural sub control means by way of the broadcast bus such that the same control information is sent to multiple ones of said plural sub control means, and the plural sub control means are operative so that in the case where control information from the main control means send out through the broadcast bus is control information with respect to corresponding one of the editing means, each of the plural sub control means carries out operation control of the editing means on the basis of the corresponding control information.

2. An editing apparatus comprising:

main control means for controlling the entirety of the apparatus;

plural editing means;

plural sub control means provided in correspondence with the respective plural editing means and adapted for carrying out operation controls of the respective editing means on the basis of control of the main control means; and connecting means for carrying connection in bus form of the plural sub control means and the main control means by broadcast bus (in a form essentially having an ability to transfer multiple address information therethrough) such that the same control information is sent to multiple ones of said plural sub control means, wherein the main control means simultaneously sends out control information to the plural sub control means by the broadcast bus, and the plural sub control means are operative so that in the case where control information from the main control means sent out through the broadcast bus is control information with respect to corresponding one of the editing means, each of the plural sub control means carries out operation control of the editing mans on the basis of the corresponding control information.

3. An editing apparatus as set forth in claim 2, wherein the main control means simultaneously sends out control information to the plural sub control means by the broadcast bus, or selectively sends out control information to a specific one of the plural sub control means.

4. An editing apparatus as set forth in claim 3, wherein the main control means sends out, as the control information, synchronization instruction information for allowing the plural editing means to be simultaneously operative.

5. An editing apparatus as set forth in claim 3, wherein the main control means sends out control program information as the control information.

* * * * *